Patented Jan. 19, 1954

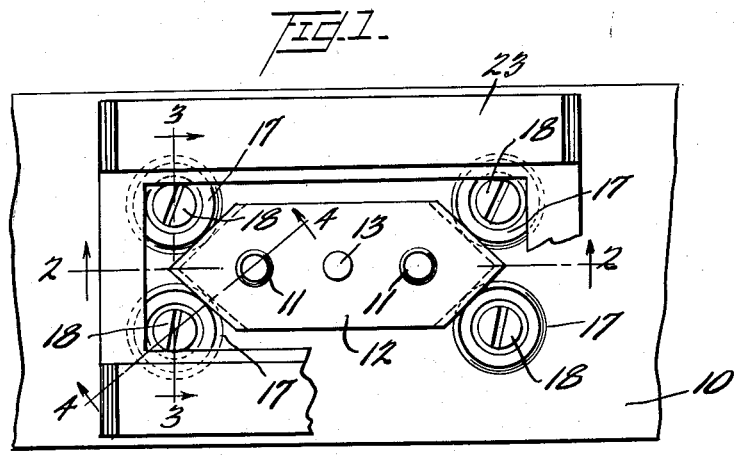
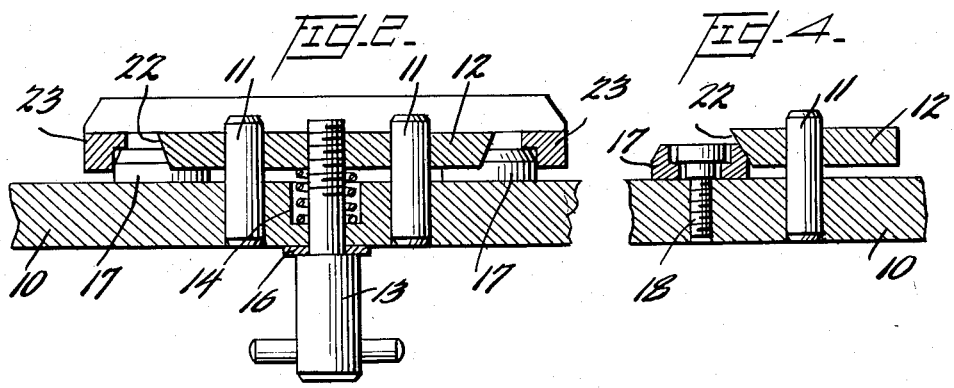
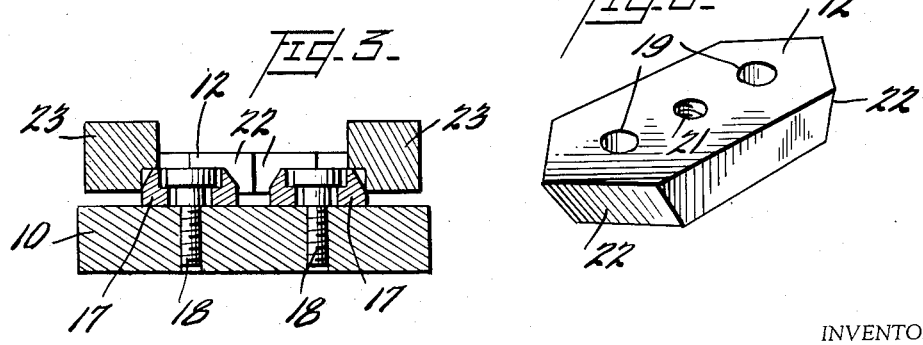

2,666,266

UNITED STATES PATENT OFFICE 2,666,266

DEVICE FOR POSITIONING ARTICLES BY COACTION WITH APERTURES OR RECESSES THEREIN

Nicholas S. Sinhel, Winston-Salem, N. C., assignor to Western Electric Company, Incorporated, New York, N. Y., a corporation of New York Application March 7, 1952, Serial No. 275,422

8 Claims. (Cl. 33—180)

This invention relates to devices for positioning objects and more particularly to such devices for positioning articles by coaction with apertures or recesses therein.

In manufacturing and other processes, it is often necessary to locate an article for subsequent machine or assembling operations. Since precision in these operations is dependent upon the accuracy in the location of the article, the importance of a device of the character described is clearly evident.

An object of the present invention is to provide a simple and efficient device or holder for accurately and positively positioning articles containing a recess or aperture.

In accordance with the above object, one embodiment of the invention provides a base to which a plurality of movable cylinders are loosely or floatingly attached. The article to be positioned is placed on the base so that the cylinders extend into the aperture, and the cylinders are then moved simultaneously into engagement with walls of the aperture by a reciprocable wedging member. The article is thus held securely in a precise location relative to the device.

Other objects of the invention will become apparent from the following detailed description and the accompanying drawing wherein:

Fig. 1 is a plan view of a preferred form of the invention showing the holder or locating device with its wedging member forcing the movable cylinders into engagement with the internal corners of a rectangular aperture in an article to be positioned;

Fig. 2 is a longitudinal sectional view of the positioning device taken along line 2—2 of Fig. 1;

Fig. 3 is a cross-sectional view taken along line 3—3 of Fig. 1;

Fig. 4 is a partial sectional view of the device taken along line 4—4 of Fig. 1, and Fig. 5 is a perspective view of the reciprocable wedging member of the device for moving the positioning cylinders.

Referring now to the drawings, wherein like reference numerals indicate the same parts throughout the several views, 10 designates a base to which are secured two upright projecting pins 11. An apertured hexagonal wedging member 12 is mounted to reciprocate on the pins 11. A centrally positioned screw member 13 extending through the base 10 and threaded into the wedging member 12 regulates the elevation of the latter. Coaxial with the screw member 13 and interposed between the base and the wedging member is a coil spring 14 which urges the wedging member away from the base. A washer 16 positioned on the underside of the base provides a bearing surface for the head of the screw member 13. Four spaced cylinders 17 are held loosely on the base 10 by machine screws 18, sufficient clearance being provided therebetween so that these cylinders are free to move laterally on the base 10 within a limited range.

Four angular end faces 22 of the wedging member 12 are inclined inwardly from top to bottom and coact with the four cylinders 17 to force them outwardly when the screw 13 is rotated to move the wedging member 12 toward the base 10.

In operating the positioning and holding device, an article 23 having a rectangular aperture is placed thereon with the wedging member in elevated position so that the four cylinders 17 are loosely movable within the aperture of the article to be accurately positioned relatively to any desired working tool, et cetera. The screw member 13 is then rotated clockwise to move the wedging member 12 toward the base 10, whereby the inclined faces 22 bear against the beveled upper portions of the movable cylinders 17 to force them outward into frictional engagement with the internal corners of the rectangular aperture of the article 23 to be positioned. The article 23 is thus held securely in a desired precise location.

It is to be understood that the above-described disclosure is simply illustrative of the application of the principles of the invention; that the floating cylinders may be placed in various arrangements to engage apertures or recesses of various contours in articles to be accurately located. Manifestly, numerous other arrangements may be readily devised by those skilled in the art which will embody the principles of the invention and fall within the spirit and scope thereof.

What is claimed is:

1. A device for positioning an article having a recess comprising a plurality of floating members, means for mounting said members in the recess with clearance to provide freedom of lateral movement of said floating members with respect to the recess within a predetermined range, and wedging means to move the floating members into engagement with the internal walls of the recess of the article to be positioned.

2. A device for positioning an article having a recess comprising a plurality of floating cylindrical members, means for loosely mounting said members to permit lateral movement of said cylindrical members relative to said recess in the article, and means to move the cylindrical members outwardly into engagement with the internal walls of said recess of the article to be positioned.

3. In a device for positioning an article having a recess, a base, a plurality of movable cylindrical members loosely attached to the base, a plurality of pins secured to the base and projecting therefrom, a wedging member slidably mounted on the pins intermediate the cylindrical members, and means to move the wedging member relative to the base to engage and force the cylindrical members outward into engagement with the article within its recess.

4. In a fixture for positioning an article having a recess, a base, four movable cylindrical members, means for retaining the cylindrical members in lateral floating relationship on the base, a hexagonal wedging member reciprocable relative to the said movable cylindrical members, pins attached to the base for guiding said wedging member, and a screw rotatably mounted in the base and threaded into the wedging member for moving the wedging member toward the base to force the cylindrical members outward into engagement with the internal walls of the article within the recess.

5. In a device for positioning an article having an aperture, a base, a plurality of cylindrical members loosely attached to the base, a hexagonal wedging member reciprocable relative to the base, pins attached to the base for guiding said wedging member, spring means urging the wedging member away from the base, and a screw rotatably mounted in the base and threaded into the wedging member for moving the wedging member toward the base to force the cylindrical members outward to engage the article within its aperture.

6. In a holding device for positioning an article having a recess therein, a base, a plurality of cylinders floatingly mounted on the base, guide pins secured to and extending from the base intermediate the cylinders, a wedging member reciprocably mounted on the pins, a helical spring between the pins to urge the wedging member from the base, and a screw coaxial with the spring and extending through the base and threaded into the wedging member for moving said wedging member toward the base against the action of the spring to force the cylinders into engagement with the article inside its recess.

7. A device for positioning an article having a recess therein, comprising a base having a pair of spaced apertures and a central aperture therebetween, a pair of guide pins secured in the pair of spaced apertures, a threaded element rotatably mounted in the central aperture, a wedging member having a pair of spaced apertures for slidably engaging the pairs of pins in the base and a threaded aperture for engaging the threaded element, a plurality of cylinders floatingly mounted on the upper surface of the base and about the wedging member, a coil spring surrounding the threaded element for urging the wedging member away from the base, and means attached to the threaded element for rotating it to move the wedging member toward the base to compress the spring and force the cylinders away from each other to engage the walls of the recess of the article to position and rigidly hold it.

8. In an apparatus for positioning an article having a recess, a base, a plurality of guide pins secured to the base, a wedging member having a plurality of angularly-cut end faces slidably mounted on the guide pins, a threaded member extending through the base and threaded into the wedging member, a spring mounted between the base and the wedging member to force the wedging member away from the base, a plurality of floating members movably secured to the base between the end faces of the wedging member and the internal walls of the recess, and means to permit movement of the floating members within a predetermined range relative to the internal walls of the recess of the article to be positioned.

NICHOLAS S. SINHEL.

References Cited in the file of this patent

UNITED STATES PATENTS

| Number | Name | Date |
|---|---|---|
| 1,436,669 | Ness | Nov. 28, 1922 |
| 1,747,657 | Avilla | Feb. 18, 1930 |
| 2,132,407 | Fowler | Oct. 11, 1938 |